(12) United States Patent
Bazzo

(10) Patent No.: US 10,583,599 B2
(45) Date of Patent: Mar. 10, 2020

(54) METHOD AND APPARATUS FOR SEQUENTIAL INJECTION MOULDING OF PLASTIC MATERIALS

(71) Applicant: INGLASS S.p.A., San Polo di Piave (Treviso) (IT)

(72) Inventor: Maurizio Bazzo, San Polo di Piave (IT)

(73) Assignee: INGLASS S.p.A., San Polo di Piave (Treviso) (IT)

( * ) Notice: Subject to any disclaimer, the term of this patent is extended or adjusted under 35 U.S.C. 154(b) by 204 days.

(21) Appl. No.: 15/647,336

(22) Filed: Jul. 12, 2017

(65) Prior Publication Data
US 2018/0029274 A1 Feb. 1, 2018

(30) Foreign Application Priority Data
Jul. 29, 2016 (IT) .......................... 102016000080198

(51) Int. Cl.
*B29C 45/76* (2006.01)
*B29C 45/00* (2006.01)
*B29C 45/13* (2006.01)

(52) U.S. Cl.
CPC ........ *B29C 45/762* (2013.01); *B29C 45/0025* (2013.01); *B29C 45/13* (2013.01); *B29C 45/7613* (2013.01); *B29C 2045/0032* (2013.01); *B29C 2945/76648* (2013.01); *B29C 2945/76658* (2013.01); *B29C 2945/76859* (2013.01)

(58) Field of Classification Search
None
See application file for complete search history.

(56) References Cited

U.S. PATENT DOCUMENTS

| | | |
|---|---|---|
| 2009/0179350 A1 | 7/2009 | Bader et al. |
| 2010/0225025 A1 | 9/2010 | Striegel |
| 2015/0266216 A1 | 9/2015 | Bazzo et al. |
| 2016/0167264 A1 | 6/2016 | Bazzo |

FOREIGN PATENT DOCUMENTS

| | | |
|---|---|---|
| DE | 102004031546 A1 | 2/2006 |
| EP | 2226173 A1 | 9/2010 |
| JP | H06238706 A | 8/1994 |
| JP | H06254895 A | 9/1994 |
| WO | 2012074879 A1 | 6/2012 |

OTHER PUBLICATIONS

Search Report for Italian Application No. IT102016000080198 dated May 29, 2017, 7 pages.

*Primary Examiner* — Monica A Huson
(74) *Attorney, Agent, or Firm* — RMCK Law Group, PLC

(57) ABSTRACT

A method and apparatus for the sequential injection moulding of plastic material into the mould cavity or by using a plurality of controlled open-close injectors, wherein the sequentially injected plastic material originates in mould flow fronts in different directions whose collision generates at least one weld line on the moulded article. The sequential injection is actuated with specific modes according to which the opening of the at least one of said injectors is anticipated or delayed with respect to other injectors and/or at least one of the injectors is closed partly and/or at least one of the injectors is gradually opened only partly. Such specific modes are managed to control and define the shape and/or the position of the weld line on the moulded article.

7 Claims, 5 Drawing Sheets

METHOD AND APPARATUS FOR SEQUENTIAL INJECTION MOULDING OF PLASTIC MATERIALS

CROSS REFERENCE TO RELATED APPLICATIONS

This application claims priority to Italian Patent Application No. 102016000080198 filed on Jul. 29, 2016, the entire disclosure of which is incorporated herein by reference.

FIELD OF THE INVENTION

The present invention regards a method and apparatus for the sequential injection moulding of plastic material.

Sequential injection finds particular application in the moulding of large components for example in the automotive industry (bumpers, spoilers etc.) which requires particularly high-quality level, both from a structural and aesthetic point of view.

Sequential injection provides for the use of a plurality of controlled close-open injectors arranged along the mould cavity, and comprises a filling phase in which said injectors are opened according to a pre-set sequence to progressively fill the mould cavity and a subsequent phase for packing the plastic material injected into the mould cavity.

One of the defects arising from sequential injection lies in the generation of weld lines that form as a result of the collision between the plastic material fronts coming from different injectors, and thus different directions. These weld lines are normally unacceptable for the required aesthetic standards, also due to an irregular profile that is observed on the surface of the moulded article, not only from an aesthetic point of view but also in that the structural stability of the article could be jeopardised due to the fact that such weld lines represent vulnerable points.

STATE OF THE ART

Various solutions aimed at reducing and if possible eliminating the creation of weld lines have been proposed in the prior art in an attempt to overcome this type of defect. However, total elimination is very difficult to obtain without entailing considerable complications in the injection system or other types of drawbacks on the moulded article.

For example, JP-H06238706 A (Honda) shows the moulding of bumpers by injecting a film, initially by means of an injector arranged at the centre of the mould cavity, and then the injectors arranged at the ends of the cavity. In particular the opening of the lateral injectors occurs when the front of the material coming from the central injector reaches them, thus mixing the two flows (one into the other) and minimising the creation of weld lines. This solution entails considerable drawbacks due to the installation complication of a film injection, as well as the increase of the thickness of the final article due to the superimposition of the two flows. In addition, the instantaneous and complete opening of the lateral injectors can leave defects such as pressure lines on the material already coming from the central injector.

JP-H06254895A1 (Honda) illustrates the same concept of managing the opening of the lateral injectors, which however inject a different material with respect to the one injected centrally. The characteristics of the material injected laterally are selected, compatibly with the central material, to minimise the occurrence of defects (pressure lines). A moulding apparatus thus made is obviously difficult to obtain, given that there is provided for the supply of two different materials for the same system, and it does not overcome the problem related to the considerable thickness of the final article.

WO-2012/074879A1 (Synventive) provides for the same concept, i.e. the opening of the lateral injectors when the flow coming from the central injector reaches them. In order to minimise the pressure lines due to the maximum flow rate instantaneous opening, this document provides for a low flow rate/speed opening, and subsequently increased up to the maximum value.

US-2016/0167264A1, on behalf of the Applicant, addresses a similar technical problem and proposes, for the solution thereof, specific modes for controlling the injectors according to which, for example, the opening of at least one injector is anticipated or delayed with respect to other injectors and/or at least one of the injectors is closed partly and/or at least one of the injectors is gradually opened only partly.

All prior art solutions described above have the common objective of eliminating or at least reducing the weld lines and the defects arising therefrom.

SUMMARY OF THE INVENTION

The present invention aims at addressing the aforementioned technical problem through a different approach and such to efficiently overcome the aforementioned drawbacks.

According to the invention this object is attained thanks to a sequential injection moulding method of the type defined in the pre-characterising part of claim 1, and corresponding to the prior art disclosed by US-2016/0167264A1, whose peculiar characteristic resides in that the specific modes for opening and closing the injectors are—all or at least partly—managed for controlling and defining the shape and/or the position of the aforementioned weld line on the moulded article.

Thus, the different approach thus proposed according to the invention enables regulating the creation of flow fronts of the plastic material injected by the different injectors so as to form a weld line of the desired shape, improved aesthetically and as regular as possible and preferably straight, for example directed transversely to the longitudinal direction of the moulded article. Once the shape of the weld line is defined, then one can intervene on the position thereof, for example translating it towards a less exposed area of the moulded article. Thus, the weld line can be positioned at will on the moulded article, in particular in a subsequently concealed area or an area that does not require high aesthetic parameters. Thus, this result can be obtained in a considerably easier manner with respect to the solutions described in the aforementioned documents on behalf of Honda and Synventive, thus also reducing the final thickness of the moulded article and avoiding the occurrence of other defects such as the formation of pressure lines.

According to the invention the method according to which at least one of the injectors is partly closed controls and defines the shape of the weld line, same case also applying to the mode according to which at least another of the injectors is gradually opened only partly.

The mode according to which the opening of at least one injector is anticipated or delayed with respect to the other injectors controls and defines the position of the weld line.

At least one of such modes is implemented in the filling phase, or at least one of such modes can be implemented in the packing phase.

BRIEF DESCRIPTION OF THE DRAWINGS

The invention will now be described in detail with reference to a non-limiting embodiment illustrated in the attached drawings, wherein.

DETAILED DESCRIPTION OF THE INVENTION

The following detailed description refers to a specific embodiment of the invention, in particular regarding the moulding of a spoiler for motor vehicles, which shall however not be deemed limiting in any manner whatsoever. The invention applies to sequential injection moulding apparatus of any type as well as the production of any article that requires sequential injection.

Figure 1:
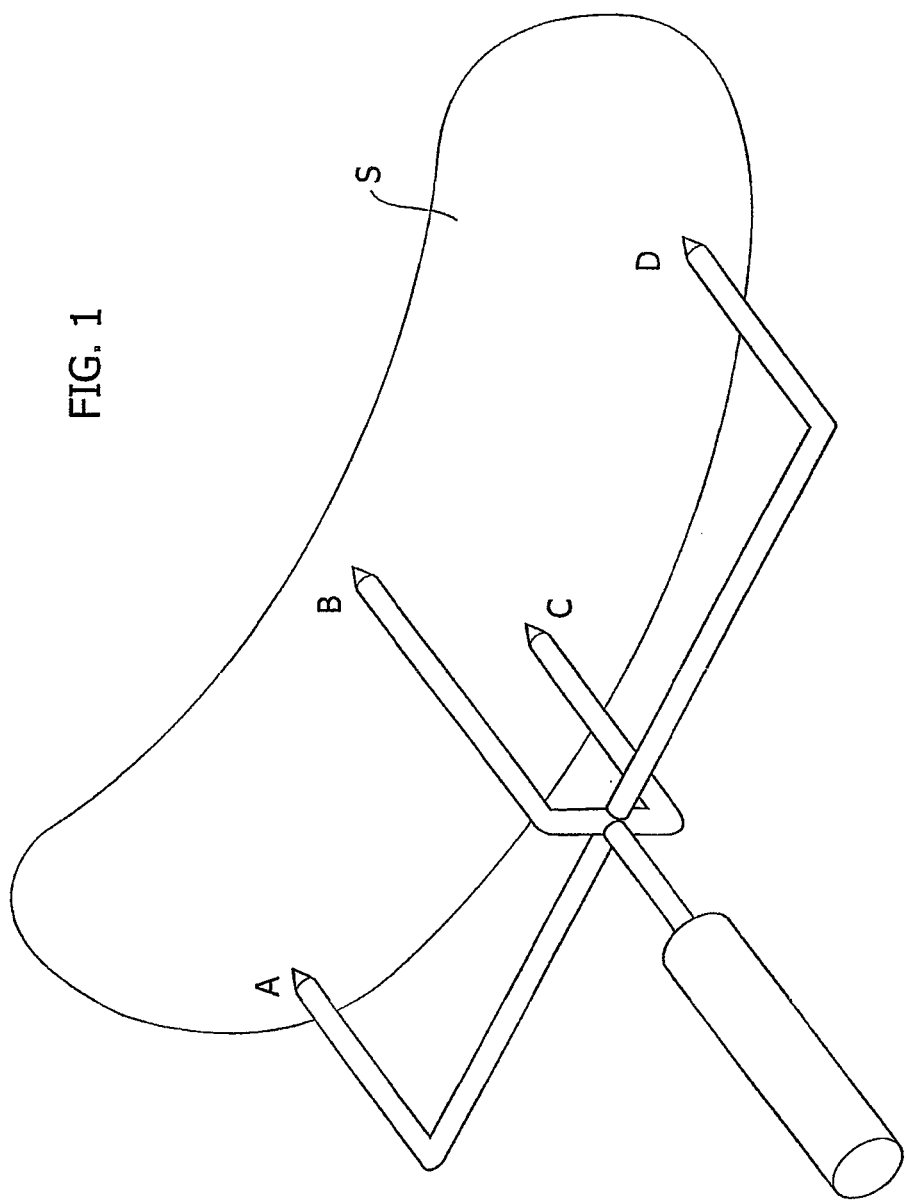
FIG. 1 generally shows the essential components of a sequential injection moulding apparatus for manufacturing a motor vehicle spoiler.

FIG. 1 schematically shows the spoiler S, or the mould cavity for the forming thereof, and it entirely generally and essentially represents a sequential injection moulding apparatus for the forming thereof. In this schematisation, the apparatus comprises four injection points respectively provided at the central area (B, C) of the spoiler S, and at the end areas (A, D) thereof.

The injection points A, B, C, D consist, in an entirely conventional manner (for example as described and illustrated in US-2015/0266216 on behalf of the Applicant, in injectors comprising a nozzle and a valve pin displaceable between a full closing position and a full opening position through an actuator preferably, though not necessarily, constituted by an autonomous electric motor controlled by an electronic unit for controlling the position and the displacement speed of the valve pin between such positions. The sequential injection typically provides for a phase for filling the mould cavity, in which the injectors are opened according to a pre-set sequence for progressively introducing the plastic material into the cavity, and a subsequent phase for packing the injected plastic material.

Figure 2:
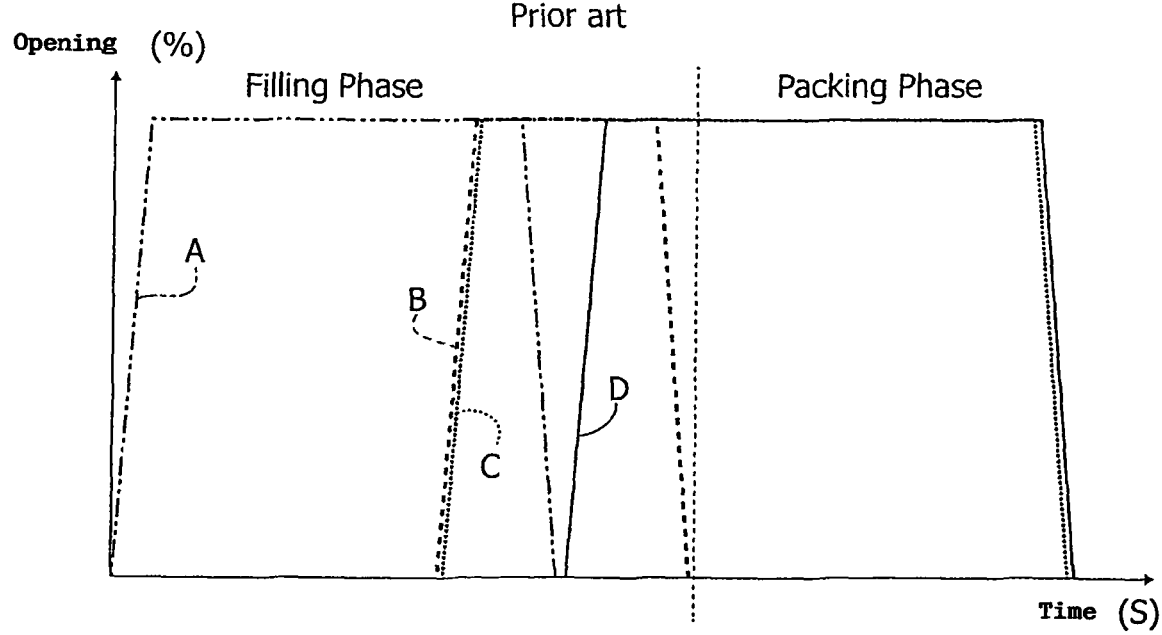
FIG. 2 is a diagram showing the modes for controlling the injectors of the moulding apparatus of FIG. 1 according to the prior art.
Figure 3:
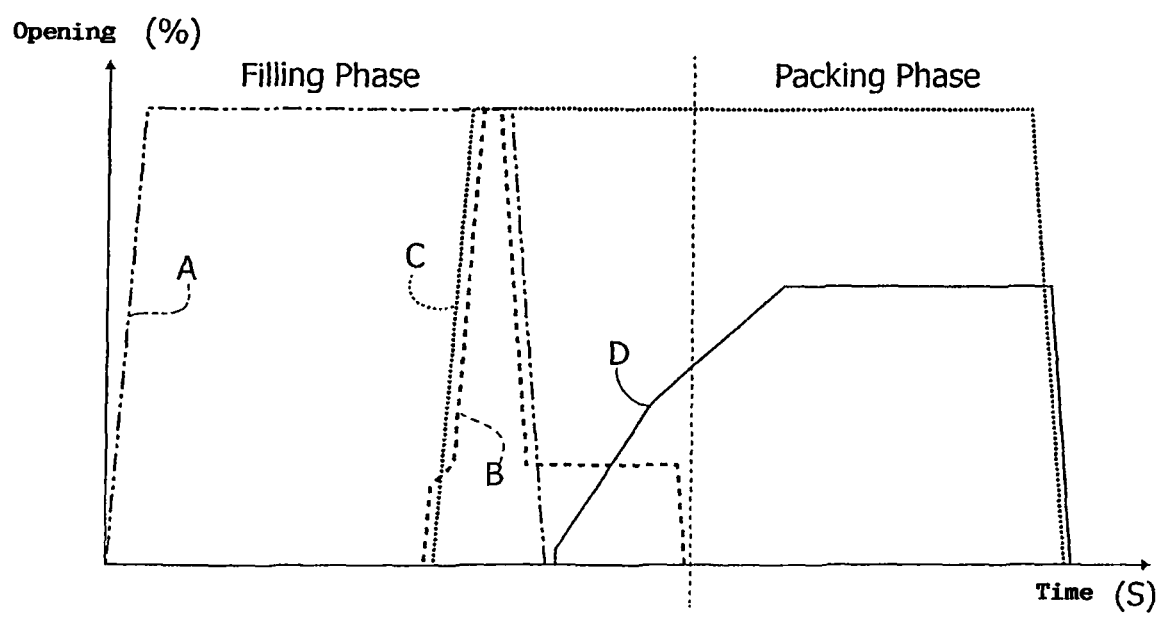
FIG. 3 is a diagram similar to the one of FIG. 2 exemplifying a specific mode for controlling the injectors implemented in compliance with an embodiment of the method according to the invention.
Figure 6:
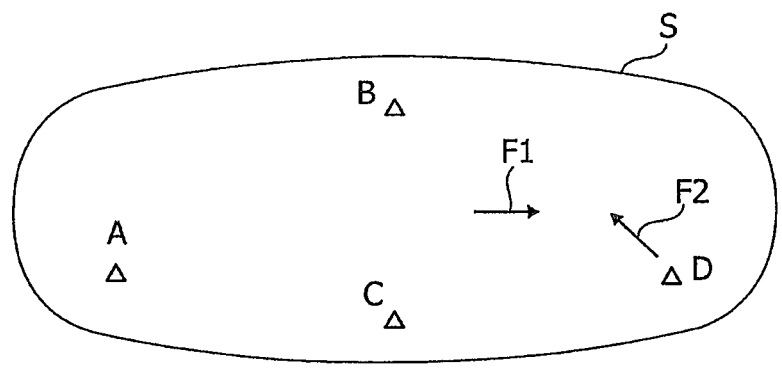
FIG. 6 is a diagram exemplifying the trend of the flows produced by the injectors of the apparatus according to FIG. 1 during sequential injection.
Figure 7:
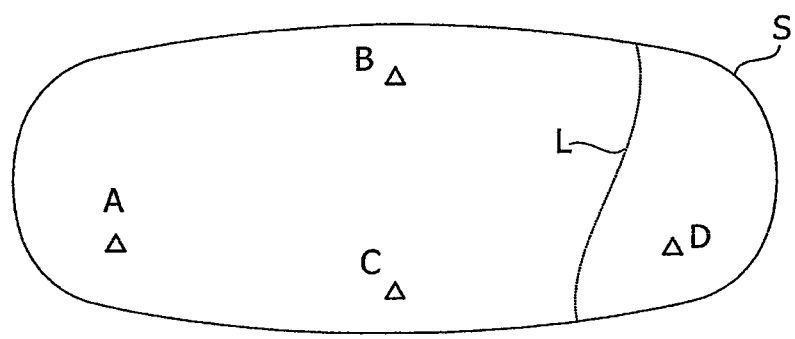
FIG. 7 shows the shape and position of the weld line generated by the collision of the flows of FIG. 6 in the case of the prior art.

FIG. 2 shows an example of a sequential injection according to the prior art thus obtained, in which the valve pins of the injectors are managed in an ON-OFF (full open-full-closed) fashion. The charts indicate, for each injector A, B, C, D, the opening percentage of the valve pin as a function of time: as observable in the filling phase, the end injector first A then followed by the central injectors B, C and lastly the end injector D, are opened suddenly and at a maximum opening value. The injectors A and B are already fully closed in the filling phase, while injectors C and D remain open up to the end of the packing phase. With this type of sequential injection, the plastic material introduced into the mould originates two flow fronts that advance in the directions represented by the two arrows F1, F2 in FIG. 6, whose collision generates the weld line schematised with L in FIG. 7. As observable in such figure, the weld line L has an irregular shape, typically S-shaped, which is aesthetically unacceptable.

Figure 4:
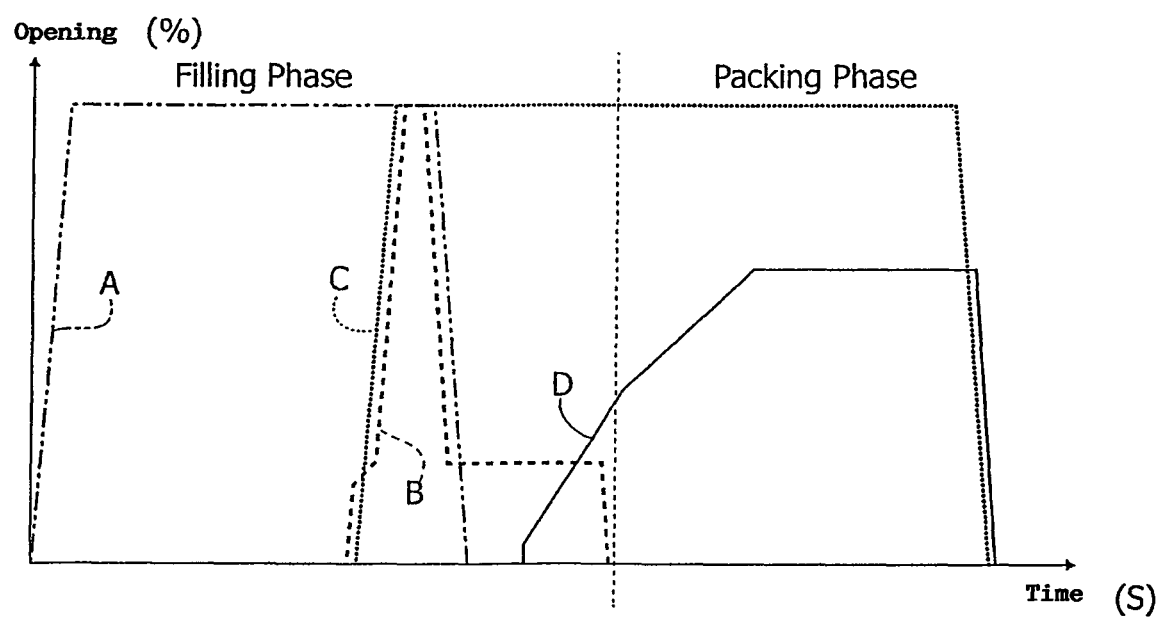
FIGS. 4 and 5 are diagrams similar to the one of FIG. 3 exemplifying further embodiments of the method according to the invention.
Figure 5:
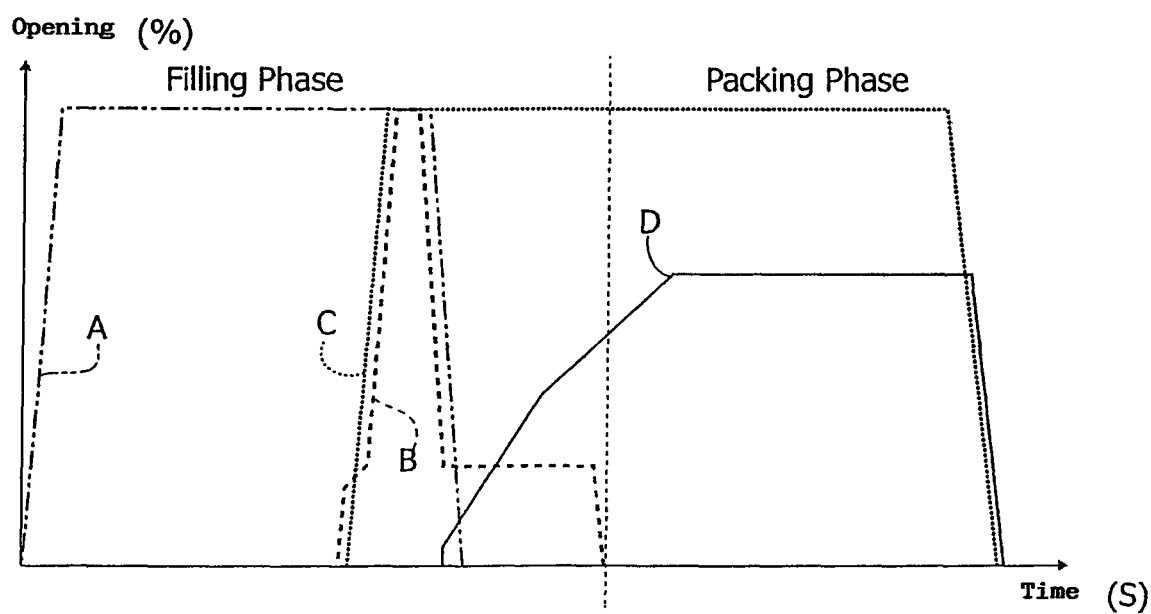
Figure 8:
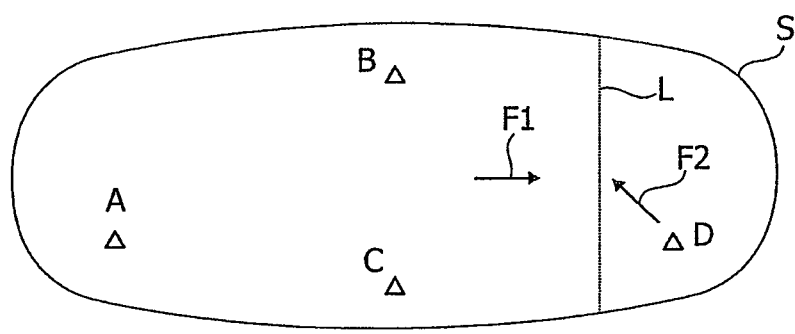
FIG. 8 is a view similar to FIG. 7 showing the shape of the flow line that can be obtained with the method according to the invention.

FIG. 5 represents—in an entirely exemplifying manner—a specific sequential injection mode that applies the disclosures of the aforementioned document US-2016/0167264 on behalf of the Applicant to some extent. In this case, the injectors A and C are controlled in a manner substantially similar to the one represented in FIG. 4, while injectors B and D are managed differently. In particular the injector B, already before the end of the filling phase, is initially closed partly and then fully. The injector D is opened gradually and only partly in the filling phase, continues the opening thereof in the packing phase too and then it is held in the partial opening condition up to the end of the packing. This specific mode, which is entirely exemplifying it should be observed, can be managed according to the invention so as to control and define the shape and position of the weld line between the two flows F1, F2 of the plastic material injected into the mould. This management for example enables conferring the weld line L the straight trend represented in FIG. 8, which—as observable—is arranged transversely to the longitudinal direction of the spoiler S and thus it is already per se aesthetically more acceptable.

It should be observed that the management of the shape of the weld line L, is essentially carried out by means of the the mode according to which, in the example described herein, the injector B is partly closed in the filling phase, and the mode according to which the injector D is opened gradually and only partly.

Figure 9:
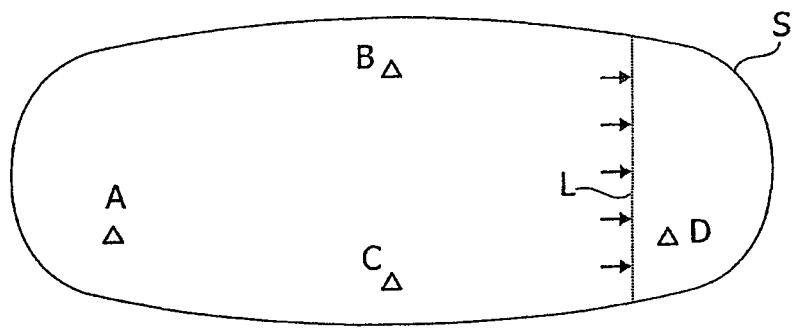
FIGS. 9 and 10 are views similar to FIG. 8 showing different possibilities of positioning the weld line.
Figure 10:
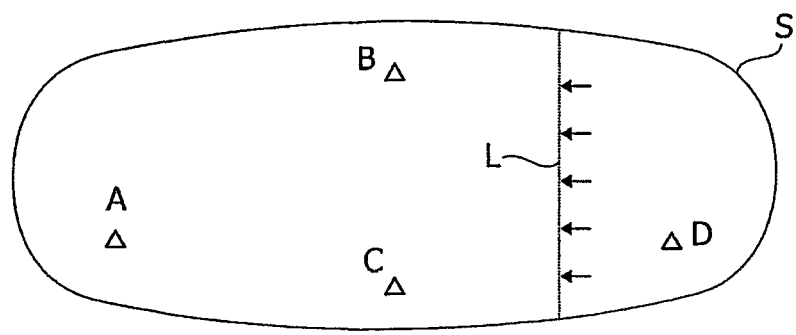
Figure 11:
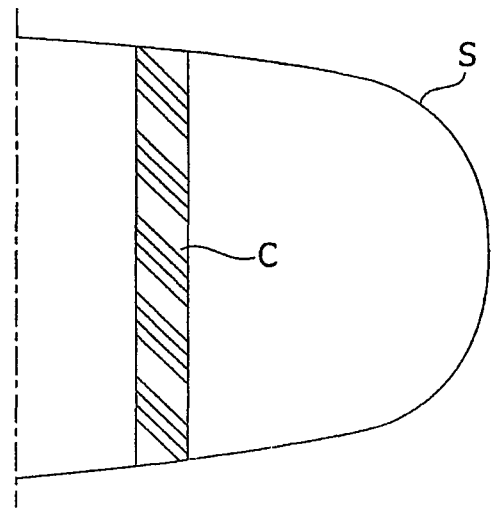
FIG. 11 shows the possible positioning of the weld line at a specific part of the moulded article.

Besides defining the shape of the weld line L, the specific sequential injection modes can also be advantageously aimed at the positioning thereof on the moulded article. Still with reference to the case of the illustrated example, and FIGS. 4 and 5 in particular, delaying or respectively anticipating the beginning of the gradual opening of the injector D for example enables displacing the straight weld line L towards the peripheral (FIG. 9) or towards the centreline (FIG. 10) of the moulded article. Thus, the weld line L may for example be translated parallel to itself until it is positioned in a non-aesthetic area, such as for example a rib of the spoiler S schematised as C in FIG. 11. In this case, the weld line L is basically invisible from the external.

Obviously, articles shaped differently from the spoiler S may require a number, a positioning and specific sequential injection modes different from those described in the example, but however managed for controlling and defining the shape and/or the position of the or of each weld line on the moulded article. In all these cases, positioning and maintaining one or more injectors in partial opening/closing position will enable defining the shape of the weld line, and the opening anticipation/delay of one or more injectors will enable defining the positioning of the weld line.

In addition, though in the case of the illustrated example the management of the specific injection modes for controlling and defining the weld line are mainly actuated in the filling phase, they can also be activated more or less extensively in the packing phase too.

The invention claimed is:

1. A method for sequential injection moulding of plastic material into a cavity of a mould by using a plurality of controlled open-close injectors arranged along the mould cavity, the method comprising:
   a filling phase in which said injectors are opened according to a pre-set sequence in order to progressively fill the mould cavity, and
   a subsequent phase for packing the plastic material injected into the mould cavity,
   wherein the sequentially injected plastic material originates flow fronts in the mould along different directions whose collision generates at least one weld line on a moulded article,
   wherein specific modes are executed according to which the opening of at least one of said injectors is anticipated or delayed with respect to other injectors and/or at least one of said injectors is partly closed and/or at least one of said injectors is opened gradually and only partly, and
   wherein said specific modes are managed so as to control and define a shape and/or a position of said weld line on the moulded article.

2. The method according to claim 1, wherein the mode according to which the opening of at least one of said injectors is anticipated or delayed with respect to the other injectors controls and defines the position of said weld line.

3. The method according to claim 1, wherein the mode according to which at least one of said injectors is partly closed controls and defines the shape of said weld line.

4. The method according to claim 1, wherein the mode according to which at least one of said injectors is opened gradually and only partly controls and defines the shape of said weld line.

5. The method according to claim 1, wherein at least one of said specific modes is performed in the filling phase.

6. The method according to claim 1, wherein at least one of said specific modes is performed in the packing phase.

7. An apparatus for sequential injection moulding of plastic material into a mould cavity by using a plurality of controlled open-close injectors, wherein the apparatus is configured to perform the method according to claim 1.

* * * * *